R. C. BAKER.
PACKER FOR OIL OR ARTESIAN WELLS.
APPLICATION FILED MAY 6, 1912.

1,037,850.

Patented Sept. 10, 1912.

Witnesses

R. C. Baker, Inventor.
by C. A. Snow & Co.
Attorneys

UNITED STATES PATENT OFFICE.

REUBEN C. BAKER, OF COALINGA, CALIFORNIA.

PACKER FOR OIL OR ARTESIAN WELLS.

1,037,850.  Specification of Letters Patent.  Patented Sept. 10, 1912.

Application filed May 6, 1912. Serial No. 695,382.

*To all whom it may concern:*

Be it known that I, REUBEN C. BAKER, a citizen of the United States, residing at Coalinga, in the county of Fresno and State of California, have invented a new and useful Packer for Oil or Artesian Wells, of which the following is a specification.

The device constituting the subject-matter of this application is a packing structure adapted to be employed for closing a leak in the building of a well.

The invention aims to provide novel means for sustaining the packing element, and to provide novel means for actuating the packing element radially to engage with the tubing.

A further object of the invention is to provide a device of this type in which the constituent members are assembled in a novel manner to provide for the mounting of the packing element in place upon the carrying portion of the structure.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
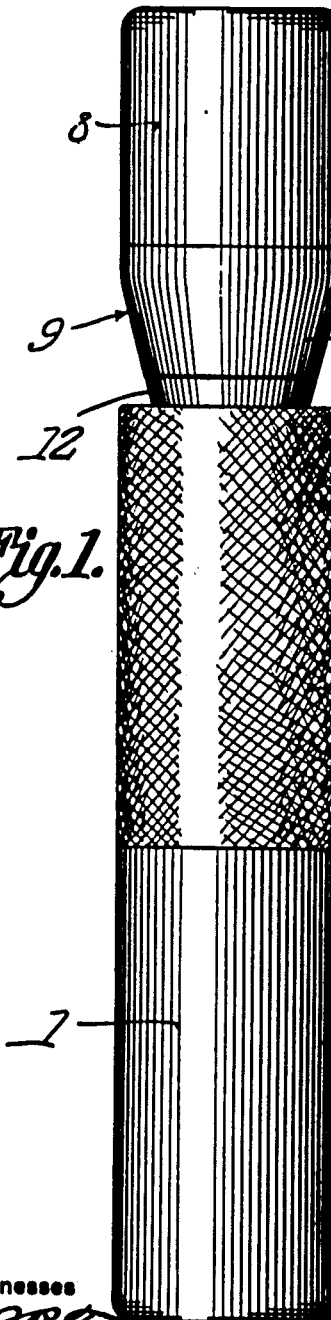
Figure 2:
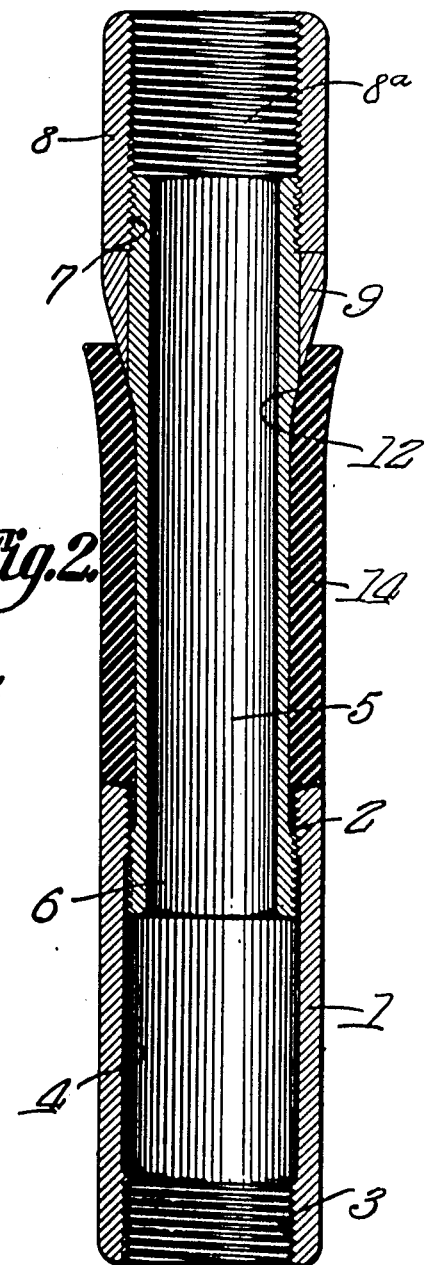

In the drawings,—Figure 1 shows the invention in side elevation; and Fig. 2 is a longitudinal section, the parts in Fig. 2 being shifted slightly from the positions shown in Fig. 1.

In carrying out the invention there is provided a tubular sleeve 1, internally threaded at its upper end as denoted by the numeral 2 and internally threaded at its lower end as denoted by the numeral 3, the intermediate portion 4 of the bore of the sleeve 1 being enlarged in diameter slightly, and being smooth, as indicated at 4.

The invention further includes a tubular plunger 5, externally threaded at its lower end as denoted by the numeral 6, for engagement with the threads 2 of the sleeve 1. At its upper end, the plunger 5 is externally threaded as indicated at 7, the outer face of the plunger being smooth between the threads 6 and 7.

The invention further includes a combined coupling and abutment 8, internally threaded as shown at 8ª for engagement with the threads 7 of the plunger 5, although a union between the member 8 and the plunger 5 may be effected in any other desired manner.

A wedge ring 9 incloses the plunger 5, the upper portion of the periphery of the ring 9 being of a common diameter with the exterior face of the member 8, as shown at 10. The wedge face of the ring 9 is indicated at 11, and upon the plunger 5 there is formed a tapered shoulder 12, constituting a continuation of the wedge face 11 of the ring 9. The upper end of the ring 9 abuts against the member 8.

Surrounding the plunger 5 is a tubular, resilient packing denoted by the numeral 14. The lower end of the packing 14 abuts against the upper end of the sleeve 1, the packing 14 lying between the sleeve 1 and the wedge ring 9.

As will be understood, an auxiliary tubing is threaded into the portion 8ª of the coupling member 8, an extension of the auxiliary tubing being assembled with the lower threads 3 of the sleeve 1, when desired.

The parts being positioned as shown in Fig. 1, the auxiliary tubing, together with the structure hereinbefore described, is lowered into place within the old tubing of the well, until the leak is reached. Thereupon the auxiliary tubing and the coupling 8 are rotated, the lower end of the coupling 8 engaging the wedge 9 and forcing the same into the upper end of the packing 14, it being noted that the packing 14 is retained at its lower end by engagement with the sleeve 1. During this initial advancement of the wedge ring 9 in the packing 14, the packing 14 will be deflected outwardly by the tapered shoulder of the plunger 5, the operation and construction being such that the packing 14 will be prevented from catching upon the thinned edge of the wedge ring 9. Continued rotation of the coupling member 8 and of the plunger 5 will cause a disengagement between the upper threads 2 of the sleeve 1 and the lower threads 6 of the plunger 5, whereupon the plunger 5, being actuated gravitationally by the entire weight of the auxiliary tubing, will move downwardly with abrupt, dropping movement, the wedge 9 being advanced into the packing 14, to expand the packing radially.

By the foregoing operation, a tight joint will be formed between the plunger 5, the packing 14, and the original tubing of the well, it being impossible, therefore, for water to flow downwardly through the leak in the original tubing, and into the well.

It is to be noted that the ring 9 is detachable from the plunger 5, and therefore the packing 14 may be placed about the plunger 5, in abutment with the upper end of the sleeve 1, the ring 9 being placed subsequently about the plunger 5, the coupling 8 being ultimately mounted upon the plunger 5, to hold the ring 9 in place.

Having thus described the invention, what is claimed is:—

1. In a device of the class described, a sleeve; a plunger detachably threaded into the sleeve for abrupt dropping movement; a combined coupling and abutment removably carried by the plunger; a wedge ring surrounding the plunger and engageable by the abutment; and a packing surrounding the plunger and abutting against the sleeve, the ring being removable to provide for the mounting of the packing, the ring being initially advanced into the packing upon rotatory movement between the sleeve and the plunger and being finally advanced thereinto by the dropping action of the plunger.

2. In a device of the class described, a sleeve; a plunger detachably threaded into the sleeve for abrupt dropping movement; a combined coupling and abutment carried by the plunger; a wedge ring surrounding the plunger and engageable by the abutment; and a packing surrounding the plunger and abutting against the sleeve, the ring being initially advanced into the packing upon rotatory movement between the sleeve and the plunger and being finally advanced thereinto by the dropping action of the plunger; there being a tapered shoulder upon the plunger, forming a continuation of the wedge face of the ring and constituting a deflector for the packing, to prevent an engagement between the thinned edge of the ring and the packing.

3. In a device of the class described, a sleeve; a plunger detachably threaded into the sleeve for abrupt dropping movement; a packing surrounding the plunger and abutting against the sleeve; wedge means actuable by the dropping movement of the plunger to expand the packing, the plunger being provided with a tapered shoulder forming a continuation of the wedge and adapted to expand the packing prior to the engagement between the packing and the wedge.

In testimony that I claim the foregoing as my own, I have hereto affixed my signature in the presence of two witnesses.

REUBEN C. BAKER.

Witnesses:
H. R. CROZIER,
S. D. PORTER.